US011014150B2

(12) United States Patent
Cho

(10) Patent No.: US 11,014,150 B2
(45) Date of Patent: May 25, 2021

(54) 3D PRINTER FOR METAL ALLOY FILAMENT

(71) Applicant: Kyungil Cho, Chungcheongnam-do (KR)

(72) Inventor: Kyungil Cho, Chungcheongnam-do (KR)

( * ) Notice: Subject to any disclaimer, the term of this patent is extended or adjusted under 35 U.S.C. 154(b) by 394 days.

(21) Appl. No.: 15/746,793

(22) PCT Filed: Jul. 7, 2016

(86) PCT No.: PCT/KR2016/007350
§ 371 (c)(1),
(2) Date: Jan. 22, 2018

(87) PCT Pub. No.: WO2017/014457
PCT Pub. Date: Jan. 26, 2017

(65) Prior Publication Data
US 2020/0078859 A1 Mar. 12, 2020

(30) Foreign Application Priority Data

| Jul. 23, 2015 | (KR) | 10-2015-0104039 |
| Sep. 20, 2015 | (KR) | 10-2015-0132743 |
| Nov. 4, 2015 | (KR) | 10-2015-0154359 |
| Mar. 31, 2016 | (KR) | 10-2016-0039234 |

(51) Int. Cl.
*B33Y 30/00* (2015.01)
*B22D 23/00* (2006.01)
*B33Y 50/00* (2015.01)
*B22D 46/00* (2006.01)

(52) U.S. Cl.
CPC ........ *B22D 23/003* (2013.01); *B22D 46/00* (2013.01); *B33Y 30/00* (2014.12); *B33Y 50/00* (2014.12)

(58) Field of Classification Search
CPC ........ B33Y 10/00; B33Y 30/00; B33Y 50/00; B22D 23/003; B22D 46/00
See application file for complete search history.

(56) References Cited

U.S. PATENT DOCUMENTS 6,722,872 B1 * 4/2004 Swanson ................. B29C 41/36
425/225

FOREIGN PATENT DOCUMENTS

| CN | 103786344 A | 5/2014 |
| CN | 105216334 A | 1/2016 |
| EP | 0 426363 A2 | 5/1991 |
| EP | 2 359 962 A2 | 8/2011 |

(Continued)

OTHER PUBLICATIONS

KR Notification of Reason for Refusal dated May 15, 2017 as received in Application No. 10-2016-0039234 [Machine Translation].

(Continued)

*Primary Examiner* — Scott R Kastler
(74) *Attorney, Agent, or Firm* — Maschoff Brennan

(57) ABSTRACT

A 3D printer for a metal alloy filament is provided in which, in order to prevent the oxidation of a metal alloy laminate, an inert gas is introduced, the outside and heat and air are blocked, and a metal alloy filament that is melted in a nozzle and extruded is laminated one layer at a time on a floor plate installed inside a heated chamber and moving three-dimensionally with respect to the nozzle, in order to firmly attach the filament having little deformation.

3 Claims, 6 Drawing Sheets

(56) References Cited

FOREIGN PATENT DOCUMENTS

| EP | 2 883 685 A1 | 6/2015 |
|----|---|---|
| JP | 09-014806 A | 1/1997 |
| JP | 2002526203 A | 8/2002 |
| JP | 2004307375 A | 11/2004 |
| KR | 10-1479900 B1 | 1/2015 |
| KR | 10-2015-0026760 A | 3/2015 |
| WO | 2014/153535 A2 | 9/2014 |
| WO | 2015/014421 A1 | 2/2015 |

OTHER PUBLICATIONS

KR Grant of Patent dated Jul. 26, 2017 as received in Application No. 10-2016-0039234 [Machine Translation].

* cited by examiner

3D PRINTER FOR METAL ALLOY FILAMENT

TECHNICAL FIELD

The present invention relates to a 3D printer wherein metal alloy filaments 650 are melted and extruded in a nozzle 600 to create a 3D laminate 520 on a floor plate 510.

More specifically, the present invention relates to a 3D printer for a metal alloy filament wherein a metal alloy filament melted and extruded in a nozzle heated by a high frequency induction heating coil 620 is piled up layer upon layer on a floor plate installed at the inside lower part of a chamber 500 heated to a similar temperature so as to enhance mutual attachment and minimize deformation.

BACKGROUND ART

Traditional 3D printers create a 3D structure by melting and extruding a thermoplastic filament or a metal alloy filament provided to a nozzle heated by means of a heater or high frequency induction heating, and by piling up the melted and extruded filament layer upon layer on a floor plate.

(Patent Document 1) Patent Publication No. CN 201510790500

(Patent Document 2) Patent No. CN 103786344 A

DISCLOSURE

Technical Problem

Usual 3D printers have a problem with firm attachment between a 3D laminate and filaments due to big differences in temperature between them and cause severe deformation due to contraction resulting from the cooling of the 3D laminate because they pile up a plastic filament or a metal alloy filament, melted in a nozzle, layer upon layer on a floor plate heated in open spaces.

However, the present invention aims at mutually firm attachment and minimization of deformation resulting from contraction of a 3D laminate, wherein a metal alloy filament melted and extruded in a nozzle heated by a high frequency induction heating coil is piled up layer upon layer on a floor plate installed inside a chamber heated to temperature similar to that of the nozzle.

Technical Solution

As a means to achieve the above-mentioned purposes, the present invention, as illustrated in FIG. 1, is characterized as follows.

Induction heating current, generated by a high frequency generator 660 is provide to an induction heating coil 620 spirally enclosing the exterior of a nozzle to heat the nozzle.

A chamber 500, blocked from the heat and air of the outside and heated by a heater is installed at the upper end of a lower sliding bed 200 sliding to the front, the rear, the left and the right.

The nozzle is installed at the lower part of a pipe shape nozzle body 600 attached to an upper sliding bed 300 sliding up and down.

A 3D laminate 520 is created wherein a metal alloy filament melted and extruded in the nozzle is piled up layer upon layer on a floor plate 510 installed at the inside lower part of a chamber and moving three dimensionally with respect to the nozzle.

Gas, generated by an inactive gas tank 700 is provided into the chamber 500 blocked from the heat and air of the outside and heated to prevent the oxidation of the 3D metal alloy laminate.

Advantageous Effects

The present invention is effective in that it can create a 3D laminate having mutually firm attachment and little deformation because a metal alloy filament melted and extruded in a nozzle is piled up layer upon layer in a chamber heated to temperature similar to that of the melted and extruded metal alloy filament.

DESCRIPTION OF SYMBOLS

Figure 1:
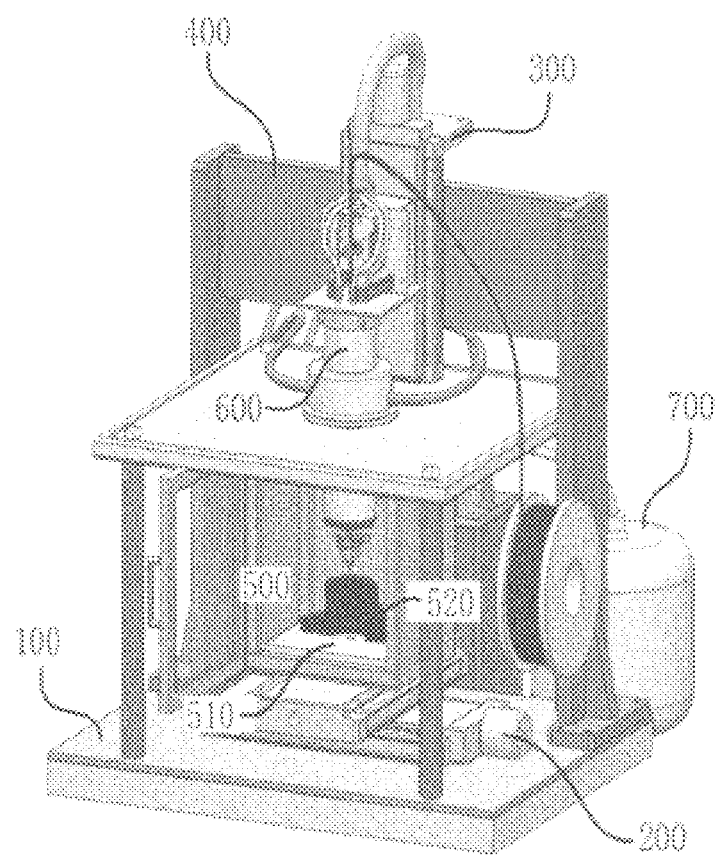
FIG. 1 is a front perspective view of a 3D printer for a metal alloy filament according to the present invention.

100: Main frame 200: Lower sliding bed
300: Upper sliding bed 350: Connecting cable 400: Vertical frame
500: Chamber 510: Floor plate 520: 3D laminate
550: Chamber lid plate 560: Sliding bush 570: Injecting mouth
580: Discharging mouth 590: Connecting bolt

PREFERRED EMBODIMENTS OF THE PRESENT INVENTION

Below, with reference to the accompanying drawings, the embodiments of the present invention are described as follows.

The present invention in FIG. 1 is described as follows.

A chamber 500, having a door at the front and having outer wall surfaces building in an insulator, is installed at the upper end of a lower sliding bed 200 installed at the lower part of a main frame 100 and capable of moving to the front, the rear, the left and the right.

A floor plate 520, having temperature similar to that of the metal alloy filament extruded from a nozzle, is installed at the inside lower part of the chamber to induce a 3D laminate 520 to be firmly attached with the floor plate.

A pipe shape nozzle body 600 is installed at an upper sliding bed 300 installed at the center of the upper part of a vertical frame 400 and moving up and down.

To promote upward and downward movements, a sliding bush 560 having a passage for allowing a pipe shape nozzle body 600 to move at the center is installed at the center of the upper part of a lid plate 550 attached on the four pillars installed at the main frame 100 and separate from the chamber.

To heat the nozzle, attached is a high frequency induction heating coil 620 spirally enclosing the exterior of the nozzle placed at the lower part of the pipe shape nozzle body.

A 3D laminate is created wherein the metal alloy filament started from a circular reel 651 is melted and extruded in the nozzle and is piled up layer upon layer on the floor plate moving three dimensionally with respect to the nozzle.

Figure 2:
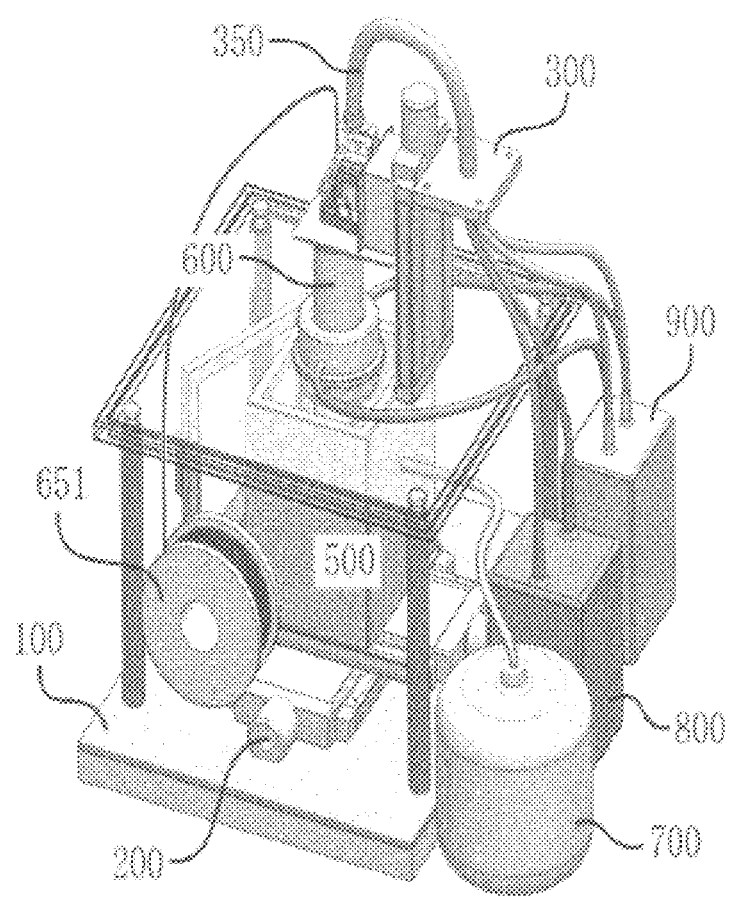
FIG. 2 is a rear perspective view of a 3D printer for a metal alloy filament according to the present invention.

The present invention in FIG. 2 is described as follows.

High frequency power generated by a high frequency power generator 800 is provided through a connecting cable 350 to a high frequency generator 660, and provided through an inner pipe formed in the nozzle body 600 to an induction heating coil placed at the lower part.

As a means to prevent the oxidation of the metal alloy filament, gases generated by an inactive gas tank 700 is provided through a hose into the chamber so that the metal alloy filament melted and extruded in the nozzle and having high temperature can be prevented from forming an oxide film, thereby leading to mutually firm attachment at the time of being piled up.

As a means to avoid overheating, cooling water generated by a cooler 900 is provided through a connecting hose to a sliding bush 560, and penetrates through the inner pipe 640 vertically formed inside the nozzle body to be provided through the connecting cable 350 to a cooling tank 630.

Figure 3:
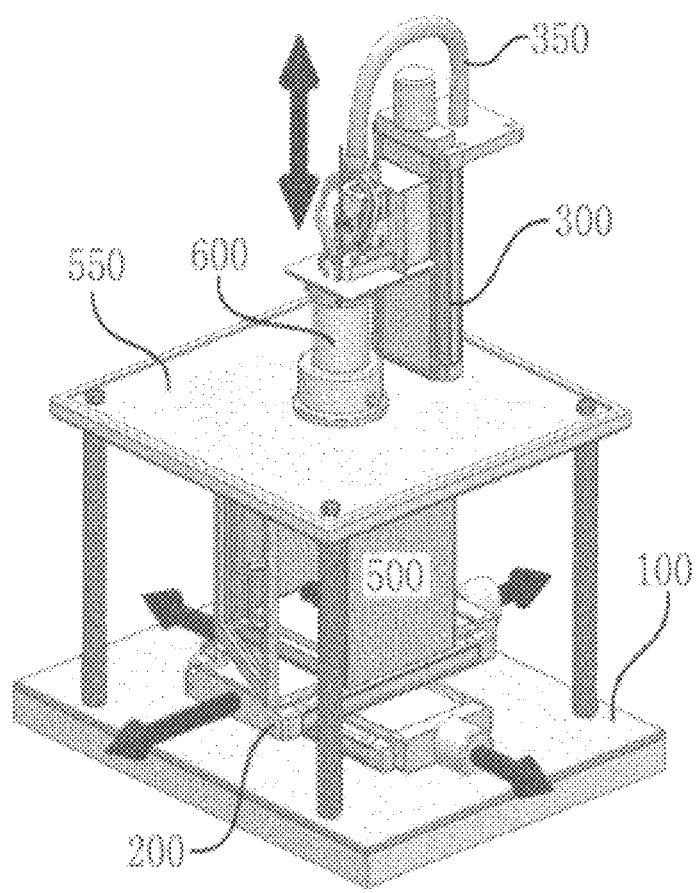
FIG. 3 is a view illustrating how the location of a chamber and a nozzle body of a 3D printer according to the present invention changes.

FIG. 3 illustrates how the location of a chamber and a nozzle body changes.

A floor plate is installed at the inside lower part of a chamber 500 having a door at the front and outer wall surfaces building in an insulator, installed on a lower sliding bed 200 capable of moving to the front, the rear, the left and the right.

A pipe shape nozzle body 600 attached to an upper sliding bed 300 moving up and down is inserted into a sliding bush 560 having a passage for sliding at the center.

The sliding bush is attached at the center of the upper part of a lid plate 550 attached on the four pillars of a main frame, separate from the outer wall surfaces of the chamber and building in an insulator.

With the above-mentioned structure, a metal alloy filament melted and extruded in a nozzle is piled up layer upon layer on a floor plate 510 three dimensionally moving with respect to the nozzle installed at the lower part of the pipe shape nozzle body to create a 3D laminate 520.

EMBODIMENTS OF THE PRESENT INVENTION

Figure 4:
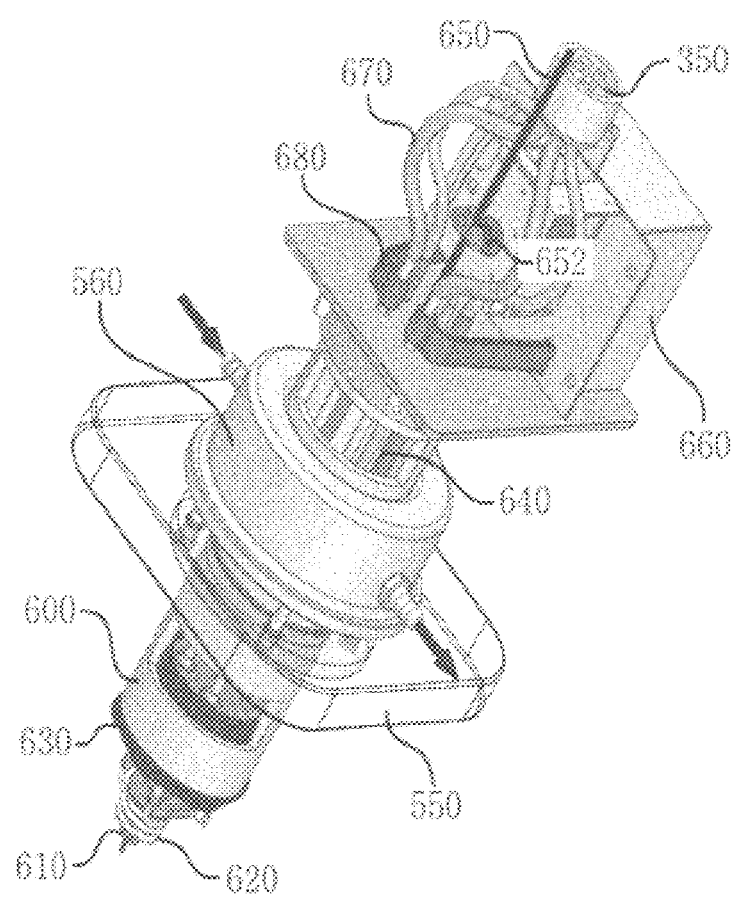
FIG. 4 is a block diagram of a nozzle body of a 3D printer for a metal alloy filament according to the present invention.

FIG. 4 illustrates a whole configuration of a nozzle body 600.

A metal alloy filament 650 started from a circular reel 651 penetrates through a pipe shape nozzle body to be transferred to a nozzle 610 placed at the lower end by using a transfer gear 652 connected to a transfer motor placed at the upper end of the nozzle body.

High frequency current generated by a high frequency generator 660 installed at the upper end of the nozzle body is provided through a fixed electrode 680 to an induction heating coil 620 placed at the lower end.

A cooling water hose 670 started from a connecting cable 350 installed at the upper end of the nozzle body is connected with an inner pipe 640 vertically formed to provide cooling water to an induction heating coil 620 and a cooling tank 630 installed in the lower part of the nozzle body and having a passage for cooling water.

Cooling water generated by a cooling-water generator 900 is provided to a sliding bush 560 attached at the center of the upper part of a lid plate 550 installed at the upper part of a chamber.

Figure 5:
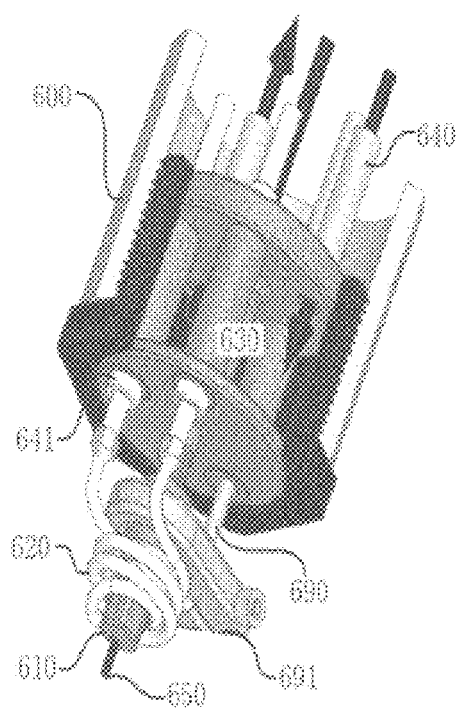
FIG. 5 is a detailed view of a nozzle of a 3D printer for a metal alloy filament according to the present invention.

FIG. 5 illustrates a configuration of a nozzle.

At the lower end of a pipe shape nozzle body 600, installed is a cooling tank 630 having a cooling water rotation passage formed inside of it and penetration passages, vertically formed inside of it, for an induction heating coil 620 and a thermocouple temperature sensor 690.

Cooling water penetrating through an inner pipe 640 formed inside of the nozzle body is injected into the cooling tank, and rotated and then discharged from the upper part to avoid the overheating of the lower end portion of the nozzle body.

A metal alloy filament 650 vertically penetrates through the inside of the pipe shape nozzle body and penetrates through a passage formed at the center of the cooling tank 630 to be injected into a nozzle 610.

High frequency current generated by a high frequency generator 660 penetrates through a vertical passage 641 insulated from the outside and formed inside the cooling tank 630 connected to a fixed electrode 680 to be provided to the induction heating coil 620 installed at the lower part.

A hole formed at the center of a "C" shape clip 691 is inserted into the upper end of the nozzle to be attached by means of bolt fastening.

A thermocouple temperature sensor 690 is inserted into and attached to a vertical hole formed inside the "C" shape clip, and an electric wire for signals penetrates through a vertical passage formed inside the cooling tank to be connected to the upper end.

Figure 6:
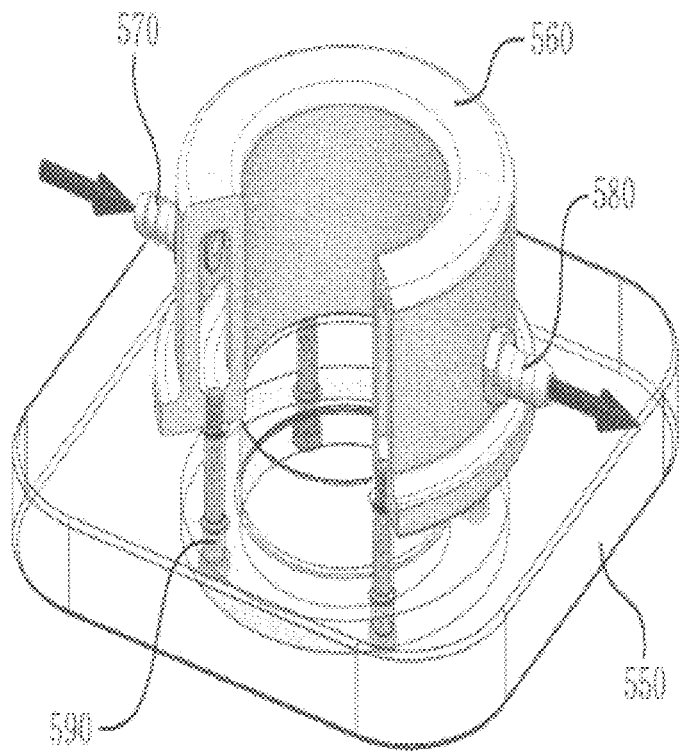
FIG. 6 is a detailed view of a sliding bush of a 3D printer for a metal alloy filament according to the present invention.

FIG. 6 illustrates a configuration of a sliding bush provided to a lid plate of a chamber.

A passage of a pipe shape nozzle body is formed at the center of a sliding bush 560 and a circular edge is formed at the lower end to be connected with a lid plate 550 building in an insulator by a bolt 590.

As a means to avoid overheating, a circular passage for cooling water is formed on the outer vertical wall surfaces of the sliding bush to provide cooling water generated by a cooler to hose connecting mouths, provided on both sides of the sliding bush, for injecting 570 cooling water and discharging 580 cooling water.

INDUSTRIAL APPLICABILITY

The present invention is applicable for manufacturing parts in companies producing equipment.

The invention claimed is:

1. A 3D printer for a metal alloy filament wherein a metal alloy filament injected into a middle passage of a nozzle by using a transfer gear, melted and extruded in the nozzle heated by a high frequency induction heating coil spirally enclosing an exterior of the nozzle is piled up layer upon layer on a floor plate placed inside a chamber and moving three dimensionally with respect to the nozzle to create a 3D laminate, the 3D printer for a metal alloy filament comprising:

a transfer gear connected to a transfer motor forcibly transferring a metal alloy filament;

a nozzle, heated by a high frequency induction heating coil, for melting and extruding the metal alloy filament;

a sliding bush attached at a center of an upper part of a lid plate installed at an upper part of a chamber in order that a pipe shaped nozzle body, having the nozzle placed at a lower part of the pipe shaped nozzle body, may be inserted and moved upward and downward; and a floor plate, placed inside a chamber, for piling up a 3D laminate thereon.

2. The 3D printer for a metal alloy filament according to claim 1, wherein:

the lid plate being is installed at an upper part of the chamber, and a sliding bush having a passage for sliding vertically formed to allow the nozzle body having a pipe shape to move up and down is attached to a center of an upper end of the lid plate.

3. The 3D printer for a metal alloy filament according to claim 2, wherein:

the sliding bush has an inner passage for cooling water horizontally formed, connecting mouths for injecting and discharging cooling water on both sides of wall surfaces thereof, and a circular edge formed at a lower end thereof to avoid overheating of the nozzle body.

* * * * *